United States Patent Office 3,175,023
Patented Mar. 23, 1965

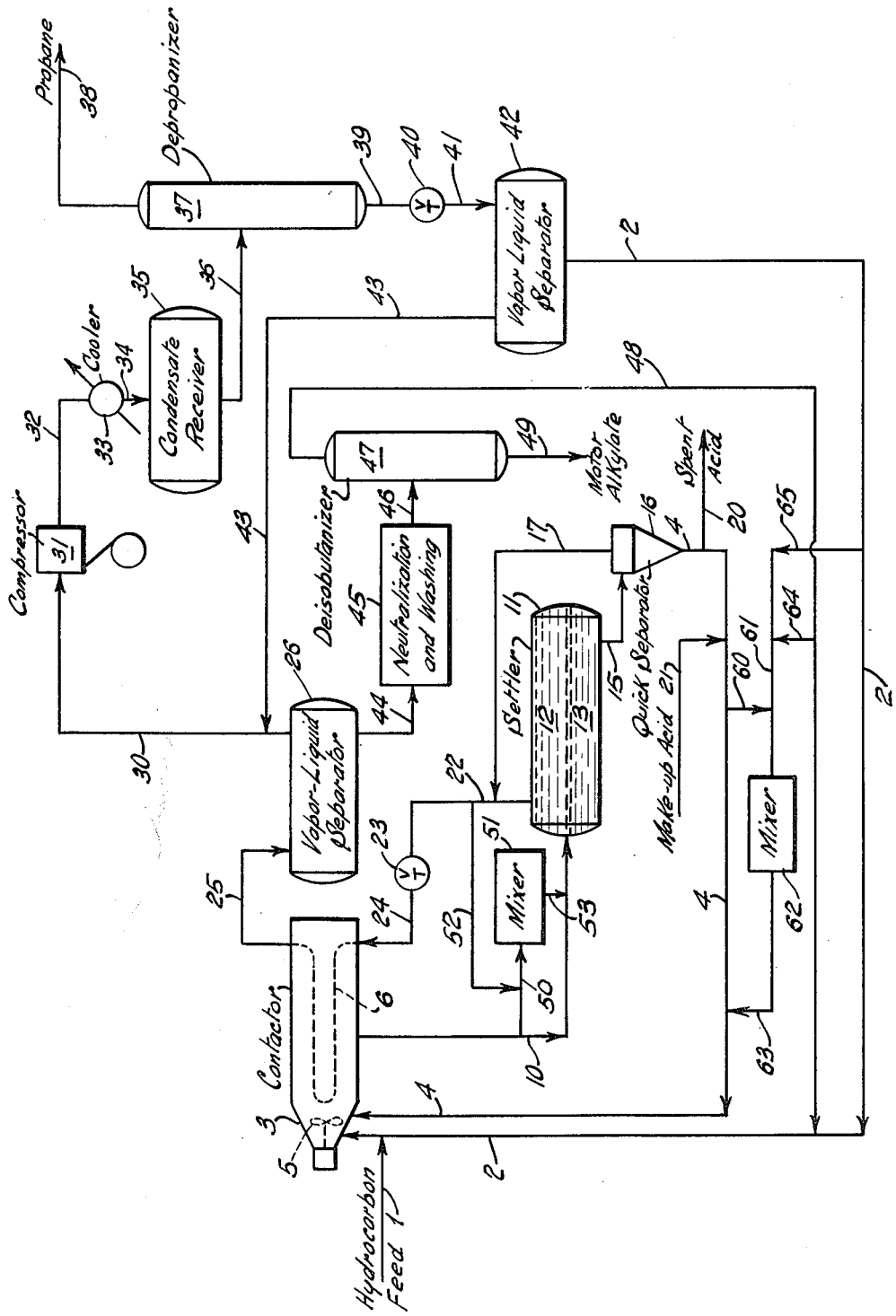

3,175,023
ALKYLATION PROCESS
Howard H. Gross, Pleasantville, and Arthur R. Goldsby, Chappaqua, N.Y., assignors to Texaco Development Corporation, New York, N.Y., a corporation of Delaware
Filed Aug. 29, 1960, Ser. No. 52,558
7 Claims. (Cl. 260—683.62)

This invention relates to a method and apparatus for the alkylation of olefin-based material with an isoparaffin. More particularly it is directed to an alkylation process wherein an olefin-based alkylatable material, an isoparaffin and an alkylation catalyst are contacted as a liquid emulsion reaction mixture in an alkylation zone under alkylation conditions, and said reaction mixture is withdrawn from said alkylation zone and separated into hydrocarbon and catalyst phases employing a gravity settling zone in combination with an accelerated separation zone.

In the catalytic alkylation of olefin-based alkylatable material with isoparaffins, a preponderance of isoparaffin, generally as much as 60 to 80 volume percent or more of the hydrocarbons in the reaction mixture, is used to direct the reaction towards the production of the most valuable aviation or automotive fuels. Consequently a large quantity of isoparaffin must be recovered and recycled for reuse in the process. Isobutane is generally used as the isoparaffin in the manufacture of aviation or motor fuels although other isoparaffins, for example, isopentane, may be employed. Although this invention will be described in terms of the use of isobutane it will be understood by those skilled in the art that other isoparaffins may be employed.

The alkylatable material reacted with isobutane is olefin-based, that is, it is generally an olefinic hydrocarbon itself such as propylene, butylenes, pentylenes and their mixtures. Other olefin-based materials which may be used include alkyl esters, for example, alkyl sulfate or alkyl fluoride as obtained in the so called "two stage" alkylation process.

In catalytic alkylation, the mol ratio of isoparaffin to olefin-based materials supplied to the alkylation zone is maintained substantially in excess of 1 to 1, and preferably in the range of about 4 to 1 to about 20 to 1. The catalyst to liquid hydrocarbon ratio is maintained in the range of about 0.5 to 1 to about 5 to 1 and preferably within the range of about 1 to 1 to about 3 to 1. Catalyst strength of at least 85% acid is maintained when sulfuric acid is used, of at least 85% when hydrogen fluoride is used, and at least about 15 weight percent aluminum chloride (expressed as equivalent of aluminum) when aluminum chloride-hydrocarbon complex liquid catalyst is used. Catalyst strength is maintained by purging spent catalyst from the system and by adding make-up catalyst of high concentration.

The olefin-based material, isobutane, and alkylation catalyst are contacted in liquid phase by forming an emulsion of the reactants and catalyst. It has been found advantageous to form a relatively "tight," slow breaking, creamy emulsion. Such an emulsion may require as much as 30 minutes or longer to break in a gravity settler. The temperature of the alkylation zone is maintained less than about 100° F. when employing hydrogen fluoride as catalyst and less than about 75° F. when sulfuric acid is employed. Alkylation temperatures of about 30 to 55° F. are preferred in alkylation with sulfuric acid. Reaction temperature may be maintained within the desired range by external refrigeration, autorefrigeration, or by effluent refrigeration.

A substantial part of the cost of operating an alkylation plant is the cost of make-up catalyst. An advantage of this invention is that substantial savings are effected in the cost of replacement catalyst. It has been found that catalyst deterioration occurs most rapidly when the catalyst has been separated from the reaction mixture. It appears that the catalyst is protected from deterioration while it is in the form of an emulsion with a substantial amount of isoparaffin. For this reason it has been proposed to effect separation of the catalyst from the emulsion rapidly and immediately return the separated acid catalyst to the reaction zone so that the catalyst is out of contact with isoparaffin for a minimum time. This method of operation, however, requires that the total amount of reactor effluent be subjected to accelerated separation. The use of accelerated separation employing centrifuges in place of the usual gravity settler has not been economically attractive, however, because of the relatively high initial cost, high operating cost, and high maintenance requirements of centrifugal separators. Additionally the emulsion from the reactor is a "tight" or slow-breaking emulsion in which the dispersed particles are difficult to coagulate and separate.

In accordance with the process of our invention a gravity settler is employed in combination with an accelerating separating device such as a centrifuge to achieve complete separation of hydrocarbon and catalyst components with a minimum investment and operating cost. In accordance with this invention, the emulsion from the reaction zone is withdrawn to a gravity settling zone wherein hydrocarbon is separated from a catalyst enriched emulsion. Less than complete settling is effected so that no free acid phase is formed and under these conditions the catalyst is protected from deterioration by the presence of the isobutane in the emulsion. The catalyst enriched emulsion is withdrawn from the gravity settler and passed to an accelerated separating device, for example a centrifugal separator, centrifuge, or cyclone, wherein separation of catalyst from remaining hydrocarbon is effected. The separated catalyst is then immediately contacted with isoparaffin. Immediate contact of the separated acid with isoparaffin may be effected by returning the separated acid directly to the reaction zone where it is contacted with the isobutane rich reaction mixture or it may be contacted with a recycle isobutane stream. The catalyst enriched emulsion from the gravity settler is of reduced volume so that less centrifuge capacity is needed to effect separation of the catalysts in this process in comparison with the capacity required to separate the catalyst from the entire reactor effluent by accelerated separation means. An advantage of our process is that relatively inexpensive gravity settling zone is employed to effect a large part of the separation and concomitantly transform the remaining emulsion into a readily separated form. The hydrocarbons present in the emulsion comprise the reactor effluent including product alkylate. Separation of these hydrocarbons before recycle of the acid catalyst prevents deterioration of product quality which may result from "over-reaction" of alkylate with the olefin and catalyst.

Accelerated separating devices useful in the process of this invention include devices effective to separate hydrocarbon-catalyst emulsions in less than about 1.0 minutes, for example, centrifuges and cyclone separators. Suitable separators effect separation in less than a tenth of the time required by simple gravity settling. We have found that substantially no catalyst degradation occurs while the catalyst is in contact with substantial quantities of isobutane in the emulsion phase. Significant deterioration of the acid does not occur so long as there is at least 10 volume percent hydrocarbon of at least 60 volume percent isobutane content present in the emulsion with the catalyst. In applicants' process deterioration of the catalyst is effectively prevented by withdrawing emulsion containing at least 10 volume percent hydrocarbon, or at least 6 volume percent isobutane from the settling zone and then separating the catalyst from the remaining hydrocarbon in a time less than 1.0 minute.

In the alkylation of olefins with isoparaffins in the presence of sulfuric acid, best alkylation results are obtained with an emulsion comprising hydrocarbon as the discontinuous phase and sulfuric acid as the continuous phase. This type emulsion is readily obtained by maintaining a ratio of catalyst to liquid hydrocarbon of at least 1 to 1. The resulting hydrocarbon in acid emulsion is highly stable and relatively difficult to separate. Separation may be accelerated by adding additional hydrocarbon to the emulsion withdrawn from the alkylation zone to reduce the ratio of catalyst to hydrocarbon below 1 to 1, thus permitting the emulsion to revert to an acid in hydrocarbon emulsion. This reversion may be readily effected by recycling a part of the hydrocarbon product into admixture with the emulsion from the alkylation zone and thoroughly mixing the recycled hydrocarbon and emulsion before introduction into the settling zone.

In accordance with one method of operation, a gravity separating zone may be employed to separate an emulsion enriched in hydrocarbon and emulsion enriched in acid. The fraction enriched in hydrocarbon is withdrawn to an accelerated separating device wherein hydrocarbon free of acid is separated from remaining emulsion of increased acid content or flat acid and thus separated acid emulsion may be passed with the emulsion enriched in acid withdrawn from the gravity separator to a second accelerated separation zone. The amount of flat acid separated may be adjusted such that only that acid which is discharged from the alkylation operation as spent acid is completely separated from hydrocarbon. In another method of operation an accelerated separating device may be used in combination with a multi-stage alkylation system to effect parallel flow of hydrocarbons through the stages while establishing series flow of acid. In such a system, emulsion from each of the stages is withdrawn to an accelerated separating device, hydrocarbon is separated from the emulsion and remaining acid enriched emulsion or flat acid is passed to a subsequent stage in the alkylation system. It is also contemplated that an accelerated separating step as disclosed herein may be employed to control the amount of hydrocarbon in an acid recycle stream to maintain a critical amount of hydrocarbon therein.

The accompanying drawing diagrammatically illustrates one form of the process of this invention. Although the drawing illustrates one arrangement of apparatus in which the process of this invention may be practiced it is not intended to limit the invention to the particular apparatus or materials described.

Hydrocarbon feed comprising make-up olefin and isobutane is introduced through line 1 with recycle isobutane from line 2 into contactor 3. Sulfuric acid catalyst is passed through line 4 into contactor 3. The hydrocarbons and catalysts are rapidly circulated in contactor 3 by means of impeller 5 forming an emulsion of hydrocarbon dispersed in acid. A part of the isobutane and olefin react to form alkylate with the liberation of heat which is absorbed by indirect heat exchange with cooling medium passed through cooling coil 6.

A part of the reaction mixture comprising emulsified hydrocarbon and acid is withdrawn through line 10 and passed to settler 11. Settler 11 is a quiescent settling zone wherein a part of the hydrocarbon separates forming a hydrocarbon phase 12 and a catalyst enriched emulsion phase 13. The formation of a separate acid phase is prevented by withdrawing the emulsion at a rate high enough so that emulsion is always withdrawn from the settler. The formation of a separate layer may be prevented by increasing the rate of withdrawal of emulsion or by lowering the level of emulsion in the settler. In this manner, an emulsion containing at least 10 volume percent hydrocarbon is continuously withdrawn from the gravity settler through line 15. This stream of catalyst enriched emulsion is passed to quick separator 16 which may be, for example, a centrifuge or a cyclone separator. Hydrocarbon free of catalyst is withdrawn through line 17 and acid is withdrawn through line 4. Catalyst is recycled through line 4 directly to contactor 3 wherein it is contacted with the hydrocarbon mixture containing a large excess of isobutane. Spent acid is withdrawn through line 20 and make-up acid is added through line 21 to maintain catalyst concentration and activity.

Hydrocarbon separated in settler 11 is withdrawn through line 22, combined with the hydrocarbon in line 17 and treated for the recovery of alkylate product and recovery of excess isobutane for recycle. In the embodiment shown in the figure, the hydrocarbon is passed to recovery facilities after being used for effluent refrigeration. Hydrocarbon liquid in line 22 is flashed through valve 23 and the resulting chilled vapor-liquid mixture is passed through line 24 to cooling coil 6 as the refrigerant or cooling medium therein. The vapor-liquid mixture discharged from the cooling coil flows through line 25 to vapor liquid separator 26 wherein isobutane rich vapor is separated from remaining liquid comprising the alkylate product and remaining isobutane. Vapor is withdrawn through line 30, compressed by compressor 31 and is discharged through line 32, cooler 33 and line 34 to condensate receiver 35. Isobutane rich condensate is withdrawn through line 36 and passed to depropanizer 37. Depropanizer 37 comprises a fractional distillation tower wherein propane is removed as an overhead fraction and discharged through line 38 for fuel or other use not shown. Depropanizer bottoms are withdrawn through line 39, flashed through valve 40 and the resulting chilled vapor-liquid mixture is passed through line 41 to separator 42. Chilled depropanized isobutane condensate is withdrawn from separator 42 and recycled to contactor 3 through line 2. Separated vapors are passed from separator 42 through line 43 to line 30 for recompressing with the vapors therein.

The liquid separated in separator 26 is withdrawn through line 44 and passed to neutralization and washing facility 45. Washed liquid is discharged through line 46 to deisobutanizer 47. Deisobutanizer 47 is a fractional distillation tower separating isobutane and lighter hydrocarbon as an overhead fraction which is discharged through line 48 and recycled to the contactor through line 2. Motor alkylate is withdrawn from the bottom of deisobutanizer 47 through line 49. The motor alkylate stream may be employed as a blending component in motor fuels or may be subjected to further distillation for the separation of normal butane and other hydrocarbon fractions as is well known in the art.

The separation of the emulsion in settler 11 may be facilitated by recycling a part of the separated hydrocarbon liquid into contact with the emulsion prior to introduction to the settler. This is shown in the figure by passing emulsion from line 10 through line 50 to mixer 51. Hydrocarbon liquid from line 22 is passed through line 52 and into mixer 51. The emulsion and additional hydrocarbon are combined increasing the hydrocarbon content of the emulsion. This increased hydrocarbon content results in more rapid separation of the hydrocarbon from remaining emulsion. Treated emulsion is withdrawn from mixer 51 through line 53 and is passed through line 10 to settler 11.

An emulsion of separated acid with recycle isobutane may be formed for return to the contactor thereby promptly contacting the separated acid with isobutane and at the same time establishing an isobutane rich emulsion into which olefin may be introduced to direct the alkylation reaction toward the production of most valuable components. This may be effected by withdrawing acid from line 4 through line 60 and combining this withdrawn acid with isobutane in line 61 and passing the mixture to mixer 62. Acid and isobutane are intimately mixed in mixer 62 forming an emulsion of isobutane in acid which is discharged through line 63 to acid recycle line 4. The isobutane employed in contacting the acid may be either isobutane recovered from deisobutanizing the liquid product from lines 48 and 64 or it may be chilled depropanized isobutane rich condensate from lines 2 and 65, or a mixture of the two isobutane streams.

*Example*

In the following example all flow rates are given in barrels (42 gallons) regardless of whether the stream is in the liquid or vapor stage. All compositions are given in liquid volume percent.

A mixed olefin feed stream at a rate of 1363 barrels per day is passed to an alkylation contactor together with 119 barrels per day of make-up isobutane and 6382 barrels per day of recycle isobutane. The compositions of the hydrocarbon streams passed to the contactor are as follows:

|  | Olefin Feed | Make-up Isobutane | Recycle Isobutane |
| --- | --- | --- | --- |
| Propane | 1.1 | 0.8 | 4.0 |
| Propylene | 0.9 | | |
| Isobutane | 36.3 | 95.0 | 86.8 |
| n-Butane | 12.0 | 4.2 | 8.6 |
| Butylenes | 46.7 | | |
| Other | 3.0 | | 0.6 |
|  | 100.0 | 100.0 | 100.0 |

Sulfuric acid of a concentration of 99.7 weight percent is added to the contactor at a rate of 22.3 barrels per day. The contactor is operated to produce an emulsion of hydrocarbon in acid.

A part of the emulsion is continuously withdrawn from the contactor and discharged to a gravity settling zone. Hydrocarbon at a rate of 7623 barrels per day is withdrawn from the gravity settling zone. Emulsion containing 10 percent hydrocarbon (71.1 percent of which is isobutane) is withdrawn from the gravity settling zone and discharged to a cyclone separator from which is separated 762 barrels per day of hydrocarbon and 7623 barrels per day of acid. The residence time of the emulsion acid in the cyclone separator is about 10 seconds. The separated acid is returned to the contactor. Hydrocarbon separated from the gravity settler and the cyclone separator are combined and passed in indirect heat exchange with the contents of the reaction zone to supply cooling thereto. Effluent from cooling the alkylation zone is treated separating 272 barrels per day of propane, 6382 barrels per day of isobutane recycle, and 1128 barrels per day of motor alkylate. Acid consumption is 0.3 pound per gallon of alkylate. Operation in the foregoing example achieves a substantial saving in acid in comparison with operation wherein all of the acid is separated by gravity settling in which case an acid consumption of about 0.5 pound per gallon produced would be expected. The separation of hydrocarbon from the acid returned to the contactor serves to produce a higher quality alkylate than is produced when recycling acid containing some unseparated hydrocarbon.

We claim:
1. In an alkylation process wherein an olefin based alkylatable material, an isoparaffin and an alkylation catalyst are contacted as a liquid emulsion reaction mixture in an alkylation zone under alkylation conditions, reaction mixture is withdrawn from said alkylation zone and separated into hydrocarbon and catalyst phases, the separated hydrocarbon phase is treated effecting recovery of product alkylate, and at least a part of the separated catalyst phase is recycled to said alkylation zone, the improvement which comprises passing said reaction mixture from said alkylation zone to a gravity settling zone, separating said reaction mixture into a hydrocarbon phase and a catalyst enriched emulsion phase containing at least 10 percent emulsified hydrocarbon in said gravity settling zone, passing said catalyst enriched emulsion to an accelerated separation zone effecting separation of a hydrocarbon phase and a catalyst phase in a time less than 1.0 minute in said accelerated separation zone, and passing the separated catalyst phase directly into contact with an isoparaffin.

2. The process of claim 1 wherein said liquid emulsion reaction mixture comprises a discontinuous hydrocarbon phase and a continuous catalyst phase.

3. A process of claim 1 wherein said catalyst enriched emulsion phase is maintained free of separated catalyst phase by withdrawing said catalyst enriched emulsion from said gravity settling zone at a rate such that formation of a catalyst phase substantially free of emulsified hydrocarbons is prevented.

4. The process of claim 1 wherein said catalyst is sulfuric acid.

5. The process of claim 1 wherein said isoparaffin is isobutane.

6. A process of claim 1 wherein said olefin based alkylatable material is an olefin selected from the group consisting of propylene, butylenes, pentylenes and their mixtures.

7. The process of claim 1 wherein said separated catalyst phase is passed directly to said alkylation zone wherein it is contacted with isoparaffin.

References Cited by the Examiner

UNITED STATES PATENTS 2,428,506 10/47 Van der Valk _____ 260—683.62
2,914,592 11/59 Crow et al. _____ 260—683.62

FOREIGN PATENTS 792,642 4/58 Great Britain.
804,966 11/58 Great Britain.

ALPHONSO D. SULLIVAN, *Primary Examiner.*